(12) United States Patent
Losi (10) Patent No.: US 11,548,319 B2
(45) Date of Patent: Jan. 10, 2023

(54) METHOD FOR CONTROLLING THE FOOTPRINT AREA OF A TYRE AND TYRE FOR VEHICLE WHEELS

(71) Applicant: PIRELLI TYRE S.P.A., Milan (IT)

(72) Inventor: Piero Losi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 451 days.

(21) Appl. No.: 16/577,603

(22) Filed: Sep. 20, 2019

(65) Prior Publication Data

US 2020/0070580 A1 Mar. 5, 2020

Related U.S. Application Data

(62) Division of application No. 14/408,081, filed as application No. PCT/IB2013/054628 on Jun. 5, 2013, now Pat. No. 10,457,099.

(Continued)

(30) Foreign Application Priority Data

Jun. 22, 2012 (IT) .......................... MI2012A001097

(51) Int. Cl.
*B60C 3/06* (2006.01)
*B60C 19/00* (2006.01)
(Continued)

(52) U.S. Cl.
CPC ............ *B60C 3/06* (2013.01); *B29D 30/0601* (2013.01); *B29D 30/08* (2013.01);
(Continued)

(58) Field of Classification Search
CPC ........... B60C 3/06; B60C 19/01; B29D 30/08; B29D 30/0601; Y10T 29/49494
See application file for complete search history.

(56) References Cited

U.S. PATENT DOCUMENTS 3,656,532 A * 4/1972 Roberts ............... B60C 15/0203
152/455
4,271,889 A * 6/1981 Pommier .................. B60C 9/30
152/454

(Continued)

FOREIGN PATENT DOCUMENTS

EP 0 755 808 1/1997
JP 2009-126424 6/2009

OTHER PUBLICATIONS

Russian Decision to Grant dated Nov. 17, 2017, from the Russian Federal Service for Intellectual Property, in counterpart Russian Application No. 2015101103.

(Continued)

*Primary Examiner* — Katelyn W Smith
*Assistant Examiner* — Philip N Schwartz
(74) *Attorney, Agent, or Firm* — Finnegan, Henderson, Farabow, Garrett & Dunner, L.L.P.

(57) ABSTRACT

Method for controlling the symmetry of the footprint area of a tyre miming on a straight trajectory with camber angle different from zero, wherein the method comprises the steps: —reducing the contact pressure of the tyre (2) on the footprint area at an inner shoulder (in case of negative camber) or at an outer shoulder (in case of positive camber); —disposing any medium line (Im) of the tread band (9) placed in correspondence with the footprint area substantially parallel to the ground; the invention also defines a tyre and a wheel for motor-vehicles, wherein the medium line (Im) of the tread hand (9) and the rotation axis (X-X) of the tyre (2) form an angle (a) substantially equal in absolute value to the camber angle (β); the invention also encompasses a process for manufacturing such tyres, wherein a green tyre with symmetric outer profile is deformed during the vulcanising and moulding step until a predetermined (Continued)

angle (a) different from zero is formed between any medium line (lm) of the tread band (9) and the rotation axis (X-X) of the vulcanised tyre (2).

13 Claims, 8 Drawing Sheets

Related U.S. Application Data

(60) Provisional application No. 61/672,036, filed on Jul. 16, 2012.

(51) Int. Cl.
*B60C 11/03* (2006.01)
*B60C 13/00* (2006.01)
*B29D 30/06* (2006.01)
*B29D 30/08* (2006.01)

(52) U.S. Cl.
CPC .......... *B60C 11/0332* (2013.01); *B60C 13/00* (2013.01); *B60C 19/001* (2013.01); *Y10T 29/49494* (2015.01)

(56) References Cited

U.S. PATENT DOCUMENTS

| | | | |
|---|---|---|---|
| 5,735,979 A | 4/1998 | Secondari | |
| 5,975,176 A | 11/1999 | Scott | |
| 2003/0155057 A1* | 8/2003 | Hubbell, Jr. | ............. B60C 3/06 152/456 |
| 2008/0000563 A1 | 1/2008 | Lia | |
| 2010/0294408 A1 | 11/2010 | Bizzi et al. | |

OTHER PUBLICATIONS

European Office Action dated Jun. 26, 2018, from the European Patent Office, in counterpart European Application No. 13 739 809.5.
International Search Report from the European Patent Office for International Application No. PCT/IB2013/054628, dated Sep. 19, 2013.
Written Opinion of the International Searching Authority from the European Patent Office for International Application No. PCT/IB2013/054628, dated Sep. 19, 2013.

* cited by examiner

METHOD FOR CONTROLLING THE FOOTPRINT AREA OF A TYRE AND TYRE FOR VEHICLE WHEELS

CROSS REFERENCE TO RELATED APPLICATIONS

This is a divisional application of U.S. application Ser. No. 14/408,081, filed Dec. 15, 2014, which is a national phase application based on PCT/162013/054628, filed Jun. 5, 2013, which claims the priority of Italian Patent Application No. MI2012A001097, filed Jun. 22, 2012, and the benefit of U.S. Provisional Application No. 61/672,036, filed Jul. 16, 2012, the content of each application being incorporated herein by reference.

The present invention has as object a method for controlling the footprint area of a tyre and a tyre for motor-vehicle wheels.

Preferably, the present invention refers to road tyres of UHP (Ultra High Performance) type and to competition tyres that equip motor-vehicles capable of high drive performances with straight line speeds even greater than 300 Km/h.

A tyre for motor-vehicle wheels generally comprises a carcass structure associated with a belt structure. A tread band is disposed at a radially external position with respect to the belt structure. The tread is the portion of the tyre that comes into direct contact with the road surface and exchanges therewith the forces that allow driving the car along the trajectories set by the driver.

By radial half-section of a tyre mounted or non-mounted on a rim, it is intended a section of the tyre carried out along a radial plane, i.e. containing the rotation axis of the tyre (or of the tyre mounted on the rim) divided into two portions of the aforesaid rotation axis.

By camber angle "P" it is intended the angle complementary to the angle formed between the rotation axis of the wheel and the axis perpendicular to the ground passing through the rotation centre of the hub. Such angle is conventionally negative if the wheel is tilted towards the car, or in other words if the lower part of the tyre that touches the ground is further away from the car than the upper tyre part.

By mid-line plane "$P_T$" of the tyre (green or vulcanised and moulded), it is intended the plane orthogonal to the rotation axis of the tyre and axially equidistant from the axially external ends of the beads of the tyre.

By mid-line plane "$P_W$" of the wheel, it is intended the plane orthogonal to the rotation axis of the wheel and axially equidistant from the axially internal ends of the two housings for the beads (rim edges) of the rim on which the tyre is mounted.

When the tyre is mounted on the rim, the two planes must coincide ($P_T \equiv P_W$).

It is observed that by axial end portions of the tread band (which in a non-deformed tyre define two circumferences corresponding to the circumferential edges of the tread band), it is intended in this context the axial end points of the tyre that touch the road surface when the tyre in operating conditions, not collapsed (mounted on a rim and inflated to the operating pressure), is overloaded with a load equal to about double the nominal load.

By median circumferential line of the tread band, it is intended the set of points "M" (which in a non-deformed tyre define a circumference) equidistant from the two axial end portions of the tread band itself. The aforesaid line is a radially external line of the tread band.

By medium line "lm" of the tread band, it is intended the straight line that, in a radial half-section of the tyre, joins the two axial end portions of the tread band.

By symmetry axis "S" of the tread band, it is intended the straight line that, in a radial half-section of the tyre, divides the tread band itself into two equal mirrored parts.

By radial distance, it is intended the distance measured along a direction orthogonal to the rotation axis "X-X" of the tyre and intersecting said rotation axis.

The document EP 0 755 808 illustrates a tyre comprising a carcass structure, which is extended around the tyre from one bead to the other, two sidewalls and a tread zone. When the tyre is mounted on a rim and inflated to a predetermined pressure, the tread zone is asymmetric and has the point of maximum diameter of the tyre shifted in the axial direction, with respect to the central line of the tyre section, towards the inner sidewall. The radial distance from the point of maximum diameter of the outer sidewall is greater than the radial distance from the point of maximum diameter of the inner sidewall, in a manner such that the tread zone has an asymmetric profile.

The document JP2009126424 illustrates a tyre having a first tread provided with a low rolling resistance, a second tread provided with a high "grip" and a third tread. With small camber angles, the first tread rests on the ground while the second and the third tread are separated from the road surface. With high camber angles, the second and the third tread come into contact with the road surface.

The Applicant has observed that the tyres are often mounted on a motor-vehicle with a camber angle for the purpose of optimizing the behaviour of the car itself.

More precisely, the Applicant has observed that, during the running of the car on a straight line, the geometry with camber angle different from zero produces a footprint area with a non-uniform pressure distribution in tyres having symmetric profile. For example, a negative camber angle produces, during the straight line advancing of the motor-vehicle, an asymmetric footprint area relative to a plane perpendicular to the ground containing the advancing direction and passing through the rotation centre of the hub and such to shift the point of application of the resulting force due to the contact pressures between the tyre and the road surface towards the inner sidewall (motor-vehicle side) of the tyre.

The Applicant deems that such effect is mainly due to the fact that the medium line of the tread band is not parallel to the supporting road surface but is tilted. It follows that, with each revolution of the wheel, the internal portion (motor-vehicle side) of the footprint area is flattened and deformed more than the external portion and this implies a non-uniform wear of the tyre in the tread (greater towards the internal portion), non-regular over time and a non-optimal behaviour, due to the inefficiency of the pressure distribution, which also negatively influences the behaviour on a bend.

For such purpose, the Applicant has set the objective of improving the performances of the tyres. In particular, the Applicant has perceived the need to propose a tyre for motor-vehicle wheels that during operation ensures a more uniform wear of the tread, more regular over time, and which prevents the performance level of the tyre from excessively degrading during the lifetime thereof.

In particular, the Applicant has perceived the importance to ensure a pressure distribution that is as uniform as possible on the footprint area of the tyre during the running on a straight line while maintaining the positive effect of the camber angle on a bend.

The Applicant has finally found that, by manufacturing a tyre for motor-vehicle wheels in which the tread band—while having a symmetric form in a radial half-section of the tyre—is rotated relative to a conventional symmetric tyre by an angle equal to the camber angle with which it is mounted on a motor-vehicle, one obtains that the medium line of the tread band placed in correspondence with the footprint area on the ground is substantially parallel to the ground. It is thus possible to make the deformation of the tyre at said footprint area uniform in straight line running. The geometry of the tyre is therefore optimised as a function of the camber angle prescribed by the manufacturer of the motor-vehicle model on which the tyre will be mounted.

More specifically, according to a first aspect, the present invention regards a method for controlling the symmetry of the footprint area of at least one same tyre running on a straight trajectory comprising:

installing said at least one tyre on a motor-vehicle with a camber angle different from zero;

disposing any medium line of a tread band of the tyre substantially parallel to the ground, once it is in correspondence with the footprint area so as to reduce the contact pressure of the tyre on the footprint area at an inner shoulder of the motor-vehicle, if the camber angle is negative, or at an outer shoulder of the motor-vehicle, if the camber angle is positive.

The Applicant deems that maintaining the medium line of the portion of the tread band that rests on the ground substantially parallel to the ground, in any case employing a camber angle, allows obtaining:

- on a straight line path, that the variation of the length of the footprint area (measured in the vehicle advancing direction) along the axial direction (orthogonal to the vehicle advancing direction) is reduced and the pressure distribution is more uniform with respect to that of a tyre with symmetric cross section mounted with an optimal, camber angle different from zero in relation to that model of motor-vehicle;
- on a bend, the beneficial effect of the camber angle on the external wheel(s), which more greatly supports the centripetal force exerted by the road surface on the tyre in a direction substantially transverse to the advancing direction, is still maintained.

In accordance with a second aspect, the present invention is related to a tyre for motor-vehicle wheels, comprising:

a carcass structure including a pair of beads having the same radial distance from a rotation axis of the tyre;

a tread band disposed at a radially external position with respect to the carcass structure;

wherein, in each radial half-section of the tyre, the tread band is symmetric to a symmetry axis thereof;

wherein, in each radial half-section, a medium line of the tread band and the rotation axis of the tyre form a predetermined angle different from zero.

In other words, by observing the tyre in the abovementioned radial half-section, the tread band and preferably also the belt structure and a crown portion of the carcass structure have a symmetric shape, relative to a symmetry axis thereof separate from the mid-line plane of the tyre, similar to that of a conventional symmetric tyre. The tread band and preferably also the belt structure and the crown portion of the carcass structure are therefore rotated, preferably around a point belonging to one of these elements, by the abovementioned predetermined angle. The tread band is circumferentially extended around the rotation axis by defining a substantially frustoconical shape.

The Applicant deems that the particular claimed geometry of the tyre allows the mounting thereof on a motor-vehicle with a camber angle different from zero, at the same time maintaining the medium line parallel to the support surface, in a manner so as to minimize the deformation irregularity (intended as asymmetry of the distribution of the length of the footprint area) of the tyre at the footprint area. Indeed, on a straight line path or with the car stopped, the footprint area and the pressure distribution along the axial extension of said area result substantially symmetric since there is no contribution given (in the tyres with symmetric profile with negative camber angle) by the greater flattening of the inner sidewall (motor-vehicle side) with respect to the outer sidewall due to the tilt (equal to the camber angle) of the medium line of the tread relative to the ground. The slight residual asymmetry is only due to the non-alignment of the median circumferential line with respect to the projection orthogonal to the road plane of the hub centre, at which the vertical force that hits the tyre is transmitted.

In accordance with a third aspect, the invention is related to a wheel for motor-vehicles, comprising:

a rim including two housings for the beads having the same radial distance from a rotation axis of the wheel;

a tyre mounted on the rim, inflated to an operating pressure and comprising a tread band;

wherein, in each radial half-section of the wheel, the tread band is symmetric to a symmetry axis thereof;

wherein, in each radial half-section, a medium line of the tread band and the rotation axis of the wheel form a predetermined angle different from zero.

In accordance with a fourth aspect, the invention is related to a motor-vehicle, comprising:

at least one wheel mounted with a predetermined camber angle different from zero;

wherein the wheel comprises a rim and a tyre mounted on the rim and inflated to an operating pressure;

wherein, in each radial half-section, a corresponding medium line of the tread band and the rotation axis of the tyre form a predetermined angle substantially equal to said predetermined camber angle, such that any medium line of the tread band placed in correspondence with the footprint area is substantially parallel to the ground.

In other words, each medium line of the tread band placed in correspondence with the footprint area forms, with the rotation axis of the wheel, an angle equal in absolute value to the camber angle, with opposite sign.

By angle (between the medium line and the rotation axis) opposite the camber angle, it is intended that, by observing the wheel in a radial plane, the rotation direction to be imparted to the rotation axis in order to make it parallel to the medium line in contact with the ground (i.e. placed in correspondence with the footprint area) is opposite the rotation direction assumed by the wheel in order to be tilted by the predetermined camber angle, or vice versa that the rotation direction to be imparted to the medium line in contact with the ground in order to make it parallel to the rotation axis is opposite the rotation direction necessary for straightening the wheel and making it assume a zero camber angle.

In accordance with a fifth aspect, the invention regards a process for manufacturing tyres for motor-vehicle wheels, comprising:

building a green tyre including at least one carcass structure having a pair of beads and a tread band disposed at a radially external position with respect to the carcass structure;

wherein any transverse half-section of said green tyre has an outer profile that is symmetric to a mid-line plane thereof;

vulcanising and moulding said green tyre;
wherein, during the vulcanising and moulding step, said tyre is deformed until a predetermined angle different from zero is formed between any medium line of the tread band and the rotation axis of the vulcanised and moulded tyre.

The Applicant deems that the aforesaid process according to the present invention allows manufacturing tyres as described without an excessive increase of costs, since for the building of symmetric green tyres, i.e. having cross section with symmetric outer profile, equipment and processes can be used of conventional type. Special equipment must be used only for vulcanising and moulding.

The present invention, in at least one of the aforesaid aspects, can also have one or more of the preferred characteristics that are described hereinbelow.

Preferably, a median circumferential line of the tread band is shifted towards the outside of the motor-vehicle by a predetermined distance relative to a mid-line plane of at least one wheel comprising said at least one tyre.

This solution, while slightly accentuating the asymmetry of the footprint area and of the pressure distribution in a straight line path, improves the behaviour on a bend since each outer tyre with respect to the curve (on which most of the centripetal force is discharged that acts on that axis of the car) is deformed and the footprint area assumes a configuration that further decreases the already slightly accentuated starting asymmetry (relative to the mid-line plane $P_W$) that is characteristic of straight line running.

In addition, such preferred solution furthermore increases (with respect to the increase already provided by the negative camber) the wheel track of the motor-vehicle, conferring greater stability thereto.

Preferably, the medium line of the tread band of said tyre remains substantially parallel to the ground during running on a bend.

The footprint area on the ground and the efficiency of the pressure distribution are therefore maximised both on a straight line path and on a bend.

Preferably, the symmetry of the footprint area is controlled during running on a straight trajectory on a set of four tyres installed in said motor-vehicle.

Preferably, the tyre according to the invention is a road tyre of UHP or competition type.

Preferably the tread band is slick.

Preferably the tread band is provided with a tread design.

More in detail, the present invention preferably refers to high-performance tyres that are dedicated to very powerful cars, or more generally to applications that involve high operating speeds and/or extreme driving conditions, such as tyres of UHP (Ultra High Performance) type or tyres used in sports, like races on tracks (with straight line speeds even exceeding 300 Km/h). The performance of such tyres benefits from the positive effect of the tyre and the wheel according to the invention, more than other less performing tyres might benefit.

Preferably said predetermined angle has a width wider than about 0.5°.

Preferably said predetermined angle has a width smaller than about 5°.

Preferably, said predetermined angle is comprised between about 0.5° and about 5°.

Such angle is selected in the field of values usually used as camber angles for road or competition motor-vehicles.

According to a preferred embodiment of the tyre, axial end portions of the tread band are axially spaced apart the same distance from the mid-line plane of the tyre.

This signifies that, relative to a conventional symmetric tyre, the tread band (and preferably also the belt structure and the crown portion of the carcass structure) is simply rotated around the point "i" identified by the intersection between the mid-line plane "$P_T$" of the tyre and the medium line "lm" of the tread band.

According to a different embodiment, a median circumferential line of the tread band is axially shifted by a predetermined distance relative to the mid-line plane of the tyre.

This signifies that, relative to a conventional symmetric tyre, the tread band (and preferably also the belt structure and the crown portion of the carcass structure) in addition to being rotated is also translated along an axial direction, i.e. a direction parallel to the rotation axis.

Preferably, said predetermined distance is included between about 3 mm and about 30 mm.

Such range is equivalent to the transverse translation of a centre line point when a wheel (tyre mounted on rim and inflated to the operating pressure) with 700 mm outer diameter passes from a zero camber to a camber angle of 0.5° as minimum and 5° as maximum, according to the simplified formula
$\delta y = Dex * \beta * \pi / 360$, where $\delta y$ is the translation of the band, Dex the outer diameter of the wheel, and $\beta$ the camber angle.

Preferably, axial end portions of the tread band have axial distances different from the mid-line plane of the tyre.

Preferably, the axial end portion that is axially the farthest from the mid-line plane is also the one that is radially the farthest from the rotation axis.

This signifies that, by observing the tyre in said radial half-section, a clockwise rotation of the tread band corresponds with a translation to the left of the same tread band and an anti-clockwise rotation of the tread band corresponds with a translation to the right of the same tread band.

Preferably, the beads are symmetric relative to the mid-line plane.

The position and the shape of the beads are substantially equal to that of a conventional symmetric tyre.

Preferably, the tyre has asymmetric sidewalls relative to the mid-line plane.

The rotation and the translation of the tread band are mainly obtained through a deformation of the beads. If the tread band is only rotated, one of the beads is radially compressed and the other radially extended relative to a symmetric tyre. If the tread band is also translated, one of the beads is rotated towards the mid-line plane and the other is rotated away from said mid-line plane.

Preferably, a median circumferential line of the tread band is axially shifted by a predetermined distance relative to a mid-line plane of the wheel.

Preferably, the rim has housings for the beads that are symmetric to a mid-line plane.

Preferably, the tyre mounted on the rim and inflated to the operating pressure has asymmetric sidewalls relative to a mid-line plane.

Preferably, the camber angle is negative.

Such preferred solution is employed in particular for very powerful and/or competition cars and ensures a better support on a bend and a better straight line stability.

Preferably the width of the camber angle is wider than about 0.5°.

Preferably the width of the camber angle is smaller than about 5°.

Preferably, the camber angle is comprised between about −0.5° and about −5°.

Preferably, a median circumferential line of the tread band is axially shifted by a predetermined distance relative to a mid-line plane of the wheel.

Preferably, the median circumferential line is shifted towards the outside relative to the motor-vehicle.

Preferably, an axial end portion of the tread band that is axially the farthest from the mid-line plane is also the one that is radially the farthest from the rotation axis.

The asymmetry of the wheels that results from the above-delineated characteristics shifts the contact between the tyres and the road towards the outside, increasing the wheel track and at the same time ensuring the maximum contact area possible both on a straight line path and on a bend.

Preferably, the rim has housings for the beads that are symmetric to the mid-line plane.

The preferred rim is per se a conventional rim that does not require any modification for receiving the tyre which gives rise to the wheel according to the invention.

Preferably, in a radial half-section of the tyre, the tread band is symmetric to a symmetry axis thereof.

Preferably, the tyre has asymmetric sidewalls relative to a mid-line plane of the wheel.

Preferably, after vulcanisation and moulding, the tread band, seen in a radial half-section of the tyre, is symmetric to a symmetry axis thereof.

Vulcanisation and moulding deform the sidewalls, increasing the diameter of one of the circumferential edges of the tread band and reducing the diameter of the other, but preferably, in each radial half-section, the tread band remains substantially undeformed and preferably the beads remain symmetric to the mid-line plane.

In a preferred embodiment, during vulcanisation and moulding, the tread band is axially shifted by a predetermined distance relative to the mid-line plane of the tyre.

Preferably, during vulcanisation and moulding, one of the two axial end portions of the tread band is moved away axially from the mid-line plane and radially from the rotation axis while the other of said two axial end portions is axially moved close to the mid-line plane and radially moved close to the rotation axis.

The roto-translation of the tread band is obtained by means of a rotation of the sidewalls (one towards the mid-line plane of the tyre and the other moving away) substantially around the respective beads. Relative to the green tyre, the extension of each of the sidewalls in the abovementioned radial half-section (intended as length of the line formed by the points equidistant from the axially internal face and axially external face of each sidewall) varies very little, i.e. the sidewalls are not subjected, in moulding and vulcanising, to excessive and damaging stretching or compression deformations.

Preferably, after vulcanisation and moulding, the tread band, seen in each radial half-section of the tyre, remains substantially undeformed.

Preferably, after vulcanisation and moulding, the beads are symmetric relative to the mid-line plane of the tyre.

Further characteristics and advantages will be clearer from the detailed description of preferred but not exclusive embodiments of a method for controlling the symmetry of the footprint area of at least one same tyre running on a straight trajectory with camber angle different from zero, of a tyre for motor-vehicle wheels, of a wheel for motor-vehicles, of a motor-vehicle and of a process for manufacturing tyres for motor-vehicle wheels in accordance with the present invention.

Such description will be set forth hereinbelow with reference to the set of drawings, provided only as a non-limiting example, in which.

With reference to the abovementioned figures, a wheel for motor-vehicles was indicated in its entirety with 1, such wheel comprising a tyre 2.

The tyre 2 has a carcass structure 3 which comprises at least one carcass ply 3a preferably internally covered by a layer of impermeable elastomeric material or so-called liner 4. Two annular anchorage structures 5, each comprising a so-called bead core 5a preferably bearing an elastomeric filler 5b at a radially external position, are engaged with respective end flaps of the carcass ply or plies 3a. The annular anchorage structures 5 are integrated in proximity to zones normally identified with the name of "beads" 6, at which the engagement between the tyre 2 and a respective mounting rim 7 normally occurs, according to a rim diameter determined by the internal diameter dimensions of the annular anchorage structures 5. A belt structure normally comprising one or more belt layers 8a is circumferentially applied around the carcass ply or plies 3a, and a tread band 9 is circumferentially superimposed on the belt layers 8a. Two sidewalls 10, each being extended from the corresponding bead 6 to a corresponding side edge of the tread band 9, are applied in laterally opposite positions on the carcass ply or plies 3a.

The rim 7, per se known, has a substantially cylindrical body 11 provided with a radially external channel, on which the tyre 2 is placed. The substantially cylindrical body 11 delimits an axially external housing 12a (i.e. directed towards the outside of a motor-vehicle when the rim is mounted on said motor-vehicle) and an axially internal housing 12b (i.e. directed towards the motor-vehicle side when the rim is mounted on said motor-vehicle), one for each bead 6 of the tyre 1, defined by respective annular slots that are radially external and symmetric relative to a mid-line plane "$P_W$" orthogonal to a rotation axis "X-X" of the wheel 1 (here substantially coinciding with the rotation axis of the tyre 2 and indicated in the same manner). The rim 7 also comprises a body 13 that is radially internal, relative to the substantially cylindrical body 11, in which devices are obtained (not illustrated and defined, for example, by holes and relative bolts) for coupling the wheel 1 to the hub of a motor-vehicle. In the illustrated embodiment, the radially internal body 13 is offset relative to the mid-line plane "$P_W$" and shifted towards the axially external housing 12a of the rim 7 in a manner so as to provide the necessary space inside the substantially cylindrical body 11 for placing the hub and the braking devices (e.g. brake discs and callipers).

The radial distance "r" of each of the two axially external/internal housings, respectively 12a, 12b, from the rotation axis "X-X", measured along a diameter of the rim 7, is the same. The axial distance "x", measured parallel to the rotation axis "X-X", of each of the two axially external/internal housings, respectively 12a, 12b, from the mid-line plane "$P_W$" is the same.

The two beads 6 of the tyre 1, each installed in a respective axially external/internal housing 12a, 12b, are also symmetric relative to the mid-line plane "$P_W$" (or "$P_T$"). The radial distance "r" of each of the two beads 6 from the rotation axis "X-X", measured along a diameter of the rim 7, is the same. The axial distance "x" of each of the two beads 6, measured parallel to the rotation axis "X-X", from the mid-line plane "$P_W$" (or "$P_T$") is the same.

Figure 1:
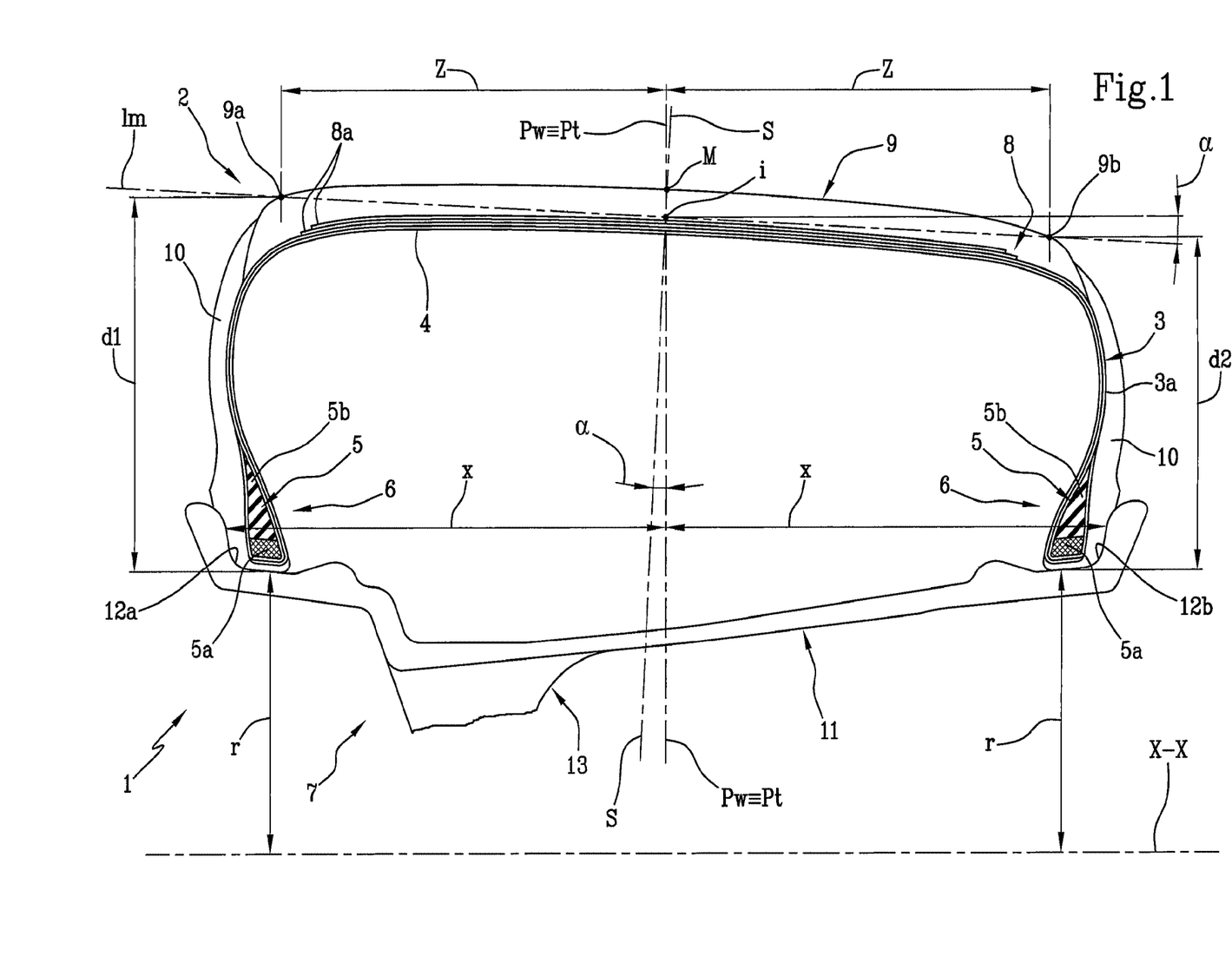
FIG. 1 shows a radial half-section of a wheel for motor-vehicles in accordance with a first embodiment of the present invention.
Figure 2:
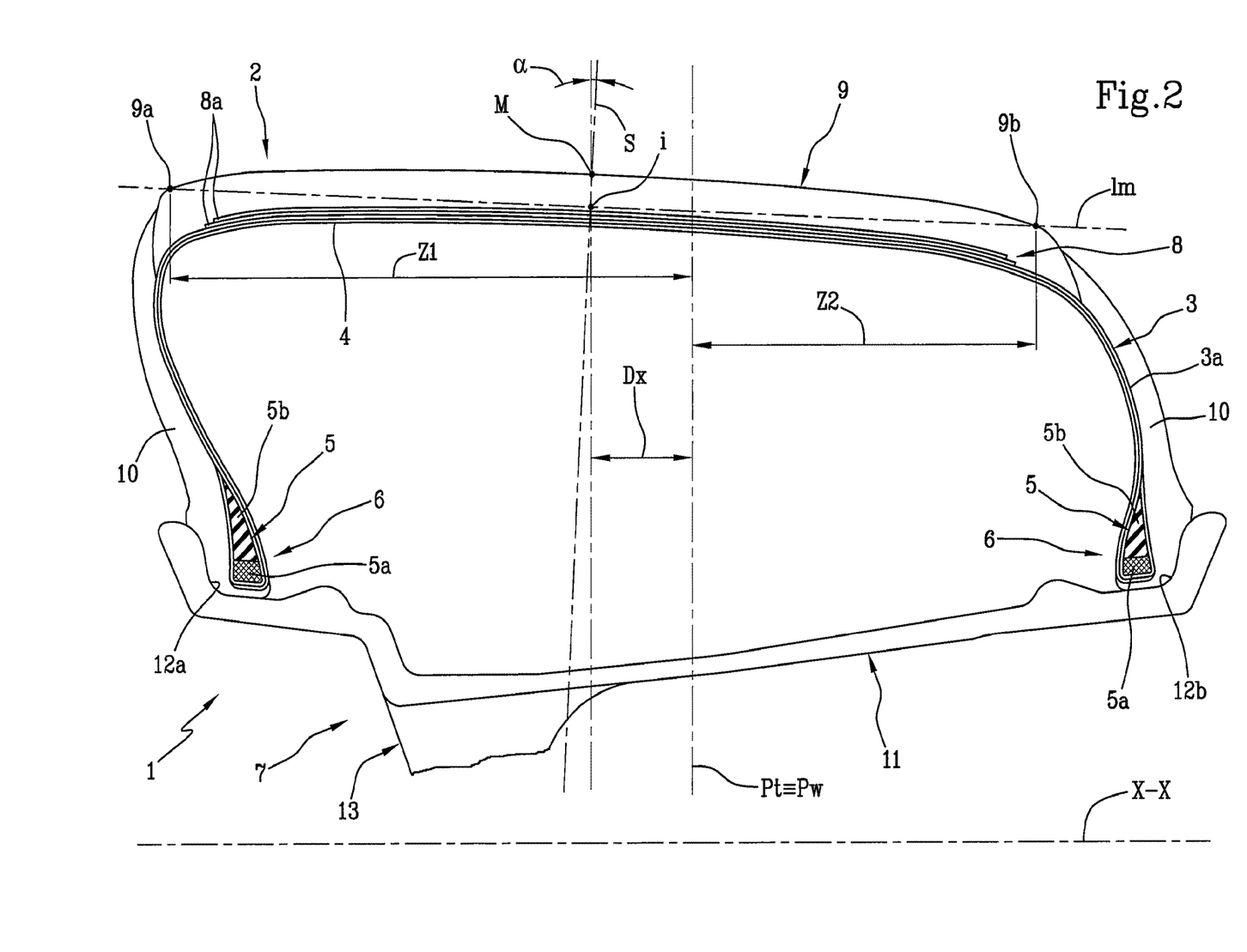
FIG. 2 shows a radial half-section of a wheel for motor-vehicles in accordance with a second embodiment of the present invention.

When the tyre 2 is not mounted on the rim and when it is mounted on the rim, inflated to the operating pressure but not subjected to external stress forces, said tyre 2 has a non-symmetric geometry in a radial section (FIGS. 1 and 2).

In both the embodiments illustrated in the enclosed figures—excluding the beads 6—the carcass structure 3, the belt structure 8, the tread band 9 and the sidewalls 10 of the tyre 2 are asymmetric to the mid-line plane "$P_W$" (or "$P_T$").

Figure 3:
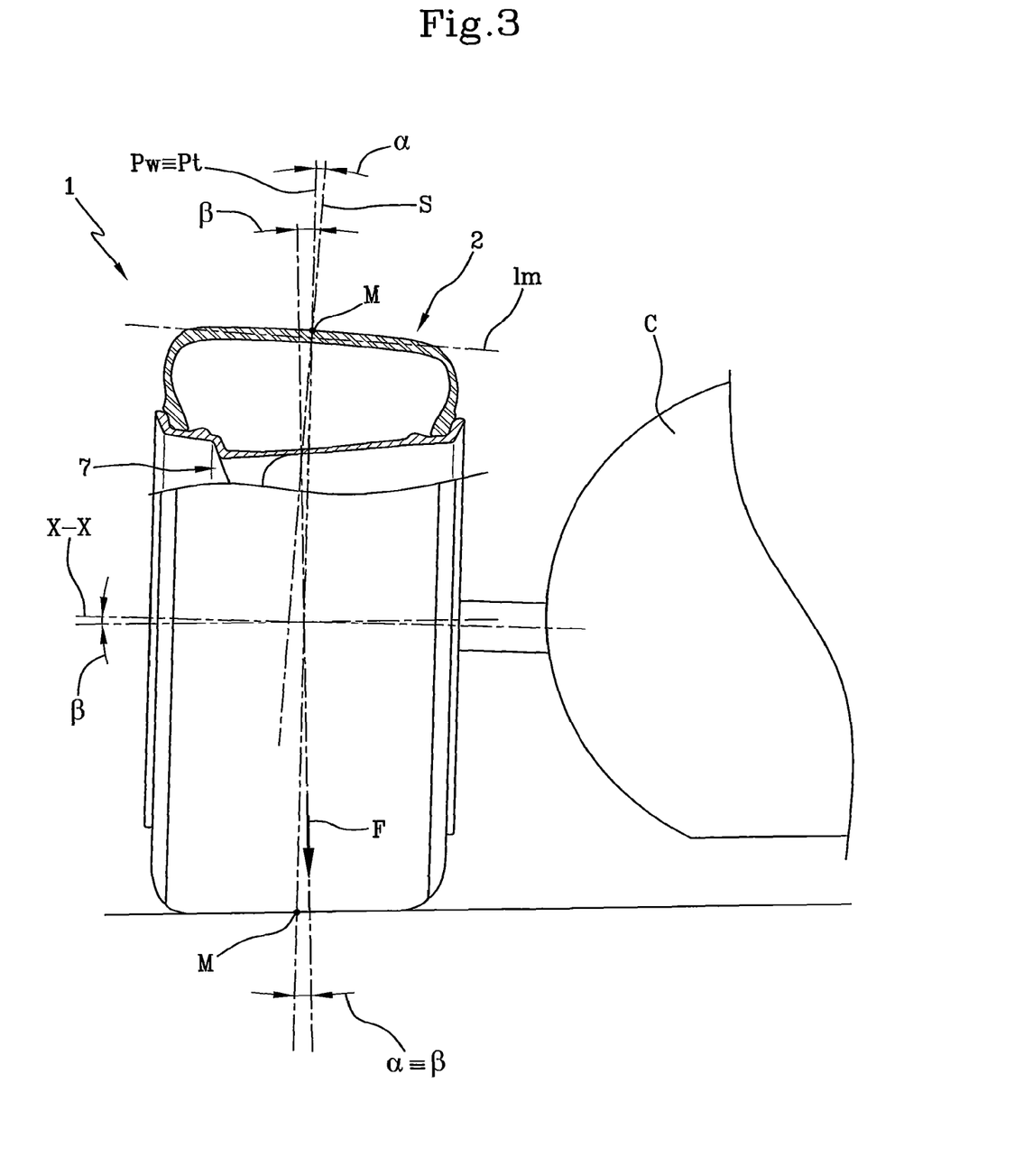
FIG. 3 schematically shows a motor-vehicle provided with the wheel of FIG. 1 in a respective operating condition.

In the first embodiment, illustrated in FIGS. 1 and 3, relative to a conventional symmetric tyre, the tread band 9 together with the belt structure 8, and at a crown portion of the carcass structure 3, seen in a radial half-section of the tyre 2, are rigidly rotated around the point "i" of intersection between the straight line corresponding to the mid-line plane "$P_W$" (or "$P_T$") and the medium line "lm" of the tread band 9 by a predetermined angle "a".

By crown portion of the carcass structure 3, it is intended the radially external portion thereof associated with the belt structure 8 and with the tread band 9.

In the embodiment illustrated as an example in FIG. 1, such predetermined angle "a" is equal to about 3°. Preferably, such predetermined angle "α" is comprised between about 0.5° and about 5°.

In the abovementioned radial half-section (FIG. 1), the tread band 9 together with the belt structure 8 and the crown portion of the carcass structure 3 maintain a symmetry thereof relative to a symmetry axis "S" that is tilted by the same predetermined angle "α" relative to the mid-line plane "$P_W$" (or "$P_T$").

The symmetry axis "S" intersects a radially external surface of the tread band 9 at a point "M" belonging to the median circumferential line of the tread band 9. The two axially opposite portions 9a and 9b of the tread band 9 have the same axial distance "Z", measured along a direction parallel to the rotation axis "X-X" of the wheel 1, from the mid-line plane "$P_W$" (or "$P_T$"). Said two opposite axial end portions 9a and 9b also have a radial distance "d1, d2", measured along a diameter of the wheel 1, from the axially external/internal housing provided on the rim 7. In particular, the radial distance "d1" of the axially external axial end portion 9a from the respective axially external housing 12a is greater than the radial distance "d2" of the axially internal axial end portion 9b from the respective axially internal housing 12b.

The medium line "lm" of the tread band 9 is therefore tilted (towards the axially internal housing 12b of the rim 7) with respect to the rotation axis "X-X" (or, as illustrated in FIG. 1, with respect to straight lines parallel to the abovementioned rotation axis "X-X") by the predetermined angle "a".

The maximum distance (or camber), measured parallel to the symmetry axis "S", between the radially external surface of the tread band 9 and the medium line "lm" is situated at the symmetry axis "S" itself. In other words, the maximum thickness of the tread band 9 (which is placed at the symmetry axis "S") is situated at the median circumferential line and in proximity to the mid-line plane "$P_W$" (or "$P_T$") of the wheel 1 or of the tyre 2.

The two-dimensional geometry just illustrated with reference to the radial half-section corresponds with a tyre 2 in which the theoretical surface that connects opposite circumferential edges (set of the points constituting the two opposite axial end portions 9a and 9b) of the tread band 9 is a truncated cone. The truncated cone is tapered towards the axially internal housing 12b of the rim 7.

The circumferential edge with smaller diameter is associated with a sidewall 10 that is radially flattened with respect to that of a corresponding conventional symmetric tyre. The circumferential edge with greater diameter is associated with the other sidewall 10 that is radially elongated with respect to that of a corresponding conventional symmetric tyre.

For example, the camber of the tread band 9 can be equal to about 1/30 of the width of the tread band (distance between the two opposite axial end portions 9a and 9b). It follows that the radially external surface of the tread band 9 is only slightly curved and has a substantially frustoconical shape.

The wheel 1 with the tyre 2 inflated to the operating pressure is mounted on the motor-vehicle "C" with a camber angle "β" different from zero (FIG. 3). In the embodiment illustrated in FIG. 3, such camber angle "β" is negative and equal to about −3°. The absolute value of the camber angle "β" is equal to the absolute value of the abovementioned predetermined angle "α". Since the axially internal housing 12b of the rim 7 is mounted directed towards the motor-vehicle "C", the truncated cone is tapered towards the motor-vehicle "C" itself. Given that the camber angle "β" is negative and equal to the predetermined angle "α", i.e. to half the angle at the vertex of the conical surface to which the truncated cone belongs, it results that the medium line "lm" of the tread band 9 placed at the ground is parallel to the ground itself (FIG. 3).

Figure 3A:
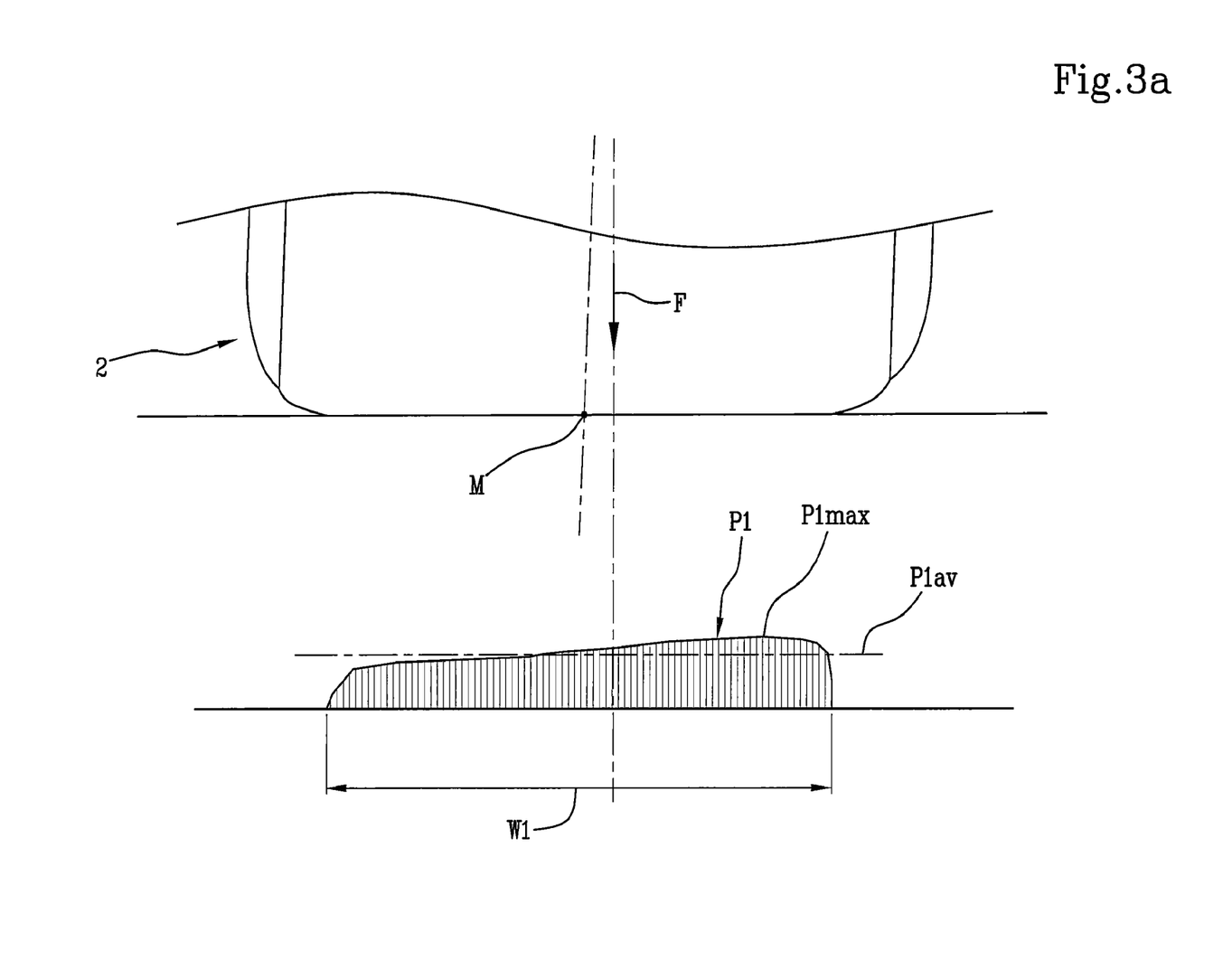
FIG. 3a illustrates the transverse distribution of the footprint contact pressures of the wheel of FIG. 3 calculated at the radial section of the tyre orthogonal to the road plane.

On a straight line path, the vertical force "F" that is discharged by the hub on the rim and then on the ground through the tyre 2 (or vice versa the force that acts from the ground on the hub by means of the tyre 2 and the rim 7) generates a distribution of pressures on the footprint area of the tyre 2. In FIG. 3a, the transverse pressure distribution "P1" (along the axial extension) of the footprint area is illustrated according to the first embodiment of the invention.

Figure 5:
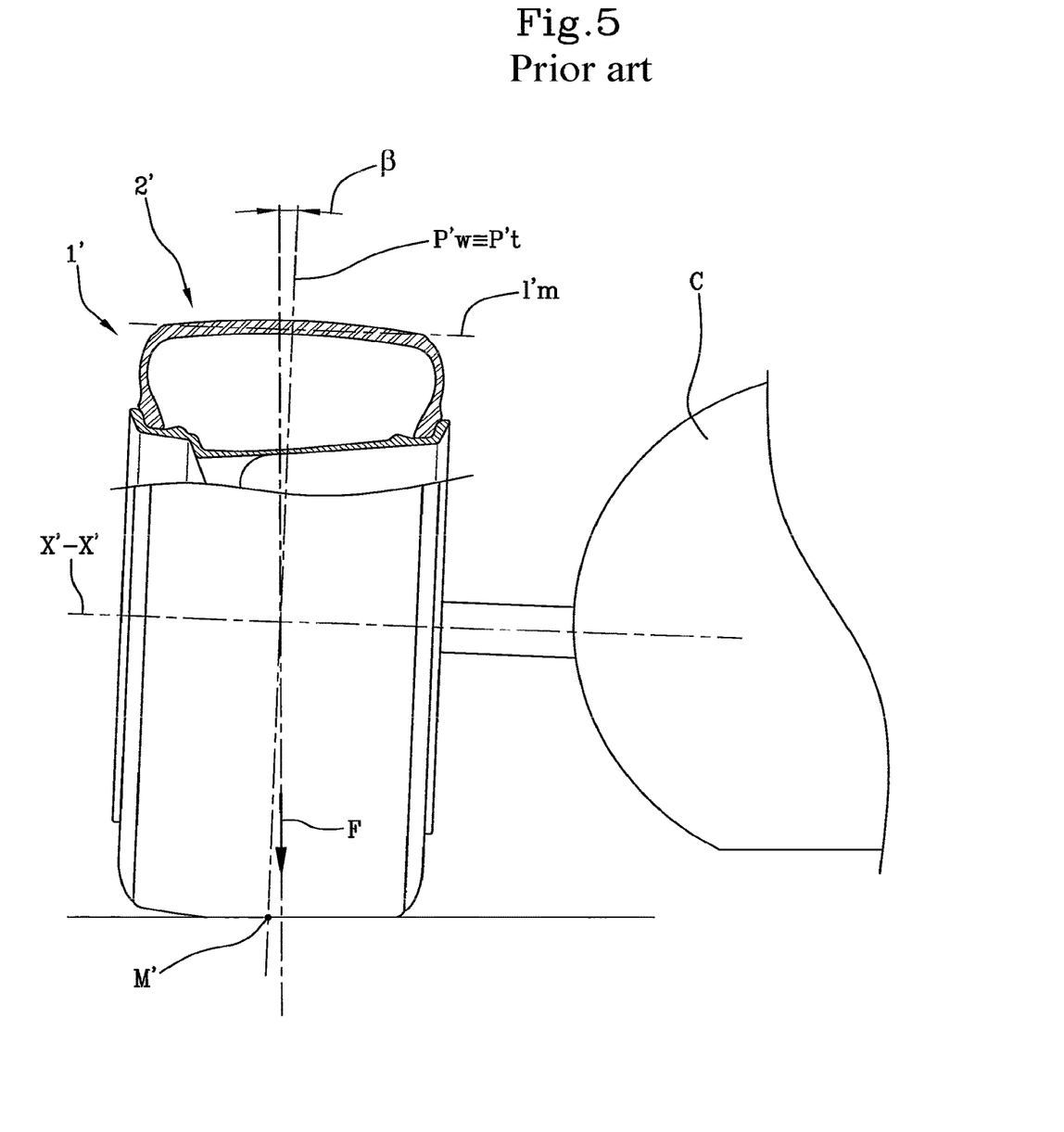
FIG. 5 schematically shows a motor-vehicle provided with a conventional symmetric wheel (belonging to the prior art) with the same camber angle of the wheels of FIGS. 3 and 4.
Figure 5A:
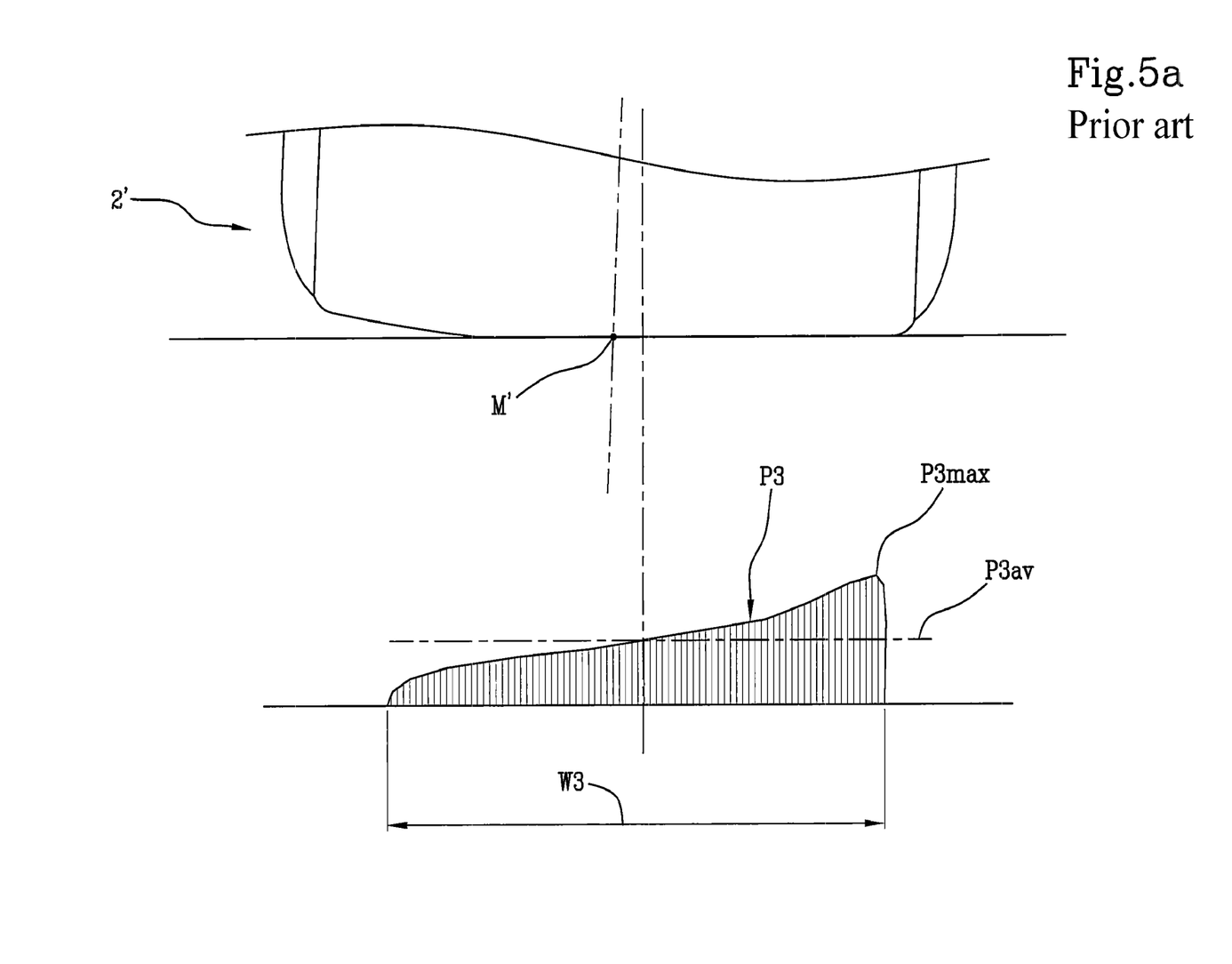
FIG. 5a illustrates the transverse distribution of the footprint contact pressures of the wheel of FIG. 5 calculated at the radial section of the tyre orthogonal to the road plane.

Illustrated in FIG. 5a is the transverse pressure distribution "P3" of the footprint area of a wheel 1' provided with a conventional symmetric tyre 2' mounted on the motor-vehicle "C" with the same camber angle "β" with which the wheel 1 is mounted according to the invention of FIG. 3. In FIG. 5a, the rotation axis "X'-X'", the medium line "l'm", the set of the points "M'" equidistant from the two axial end portions of the tread band, the symmetry plane "$P'_W$" of the wheel 1 and the symmetry plane "$P'_T$" of the tyre 2' according to the prior art are marked by a prime.

As can be observed, the transverse pressure distribution on the tyre 2 of FIG. 3a is more uniform than that of the conventional tyre 2' of FIG. 5a. In particular, in the conventional tyre 2' of FIG. 5 the transverse distribution of the footprint contact pressures "P3" is strongly asymmetric due to the greater flattening of the internal side of the tyre 2' due to the negative camber and to the respective medium line tilted relative to the road plane.

In the tyre 2 according to the invention of FIG. 3, the transverse distribution of the footprint contact pressures "P1" (FIG. 3a) is only slightly asymmetric and such slight asymmetry is due only to the non-alignment between the centre line of the footprint area (which corresponds to the median circumferential line of the tread band 9 placed in correspondence with the footprint area) and the vertical line along which the force "F" acts. The asymmetry of the pressure distribution "P1" is reduced since the medium line "lm", tilted with respect to the rotation axis "X-X" by the predetermined angle "α" equal to the camber angle "β" (with opposite sign thereto), is parallel to the road plane.

Considering an average pressure, intended integral of the transverse pressure distribution "P1", "P3" divided by the width "W1", "W3" of the footprint area, the peak pressure "P3max" of the distribution "P3" according to the prior art is about double the average pressure "P3av" of the same distribution. Instead, the peak pressure "P1max" of the distribution "P1" according to the first embodiment is only about ⁴⁄₃ of the average pressure "P1av".

Figure 4:
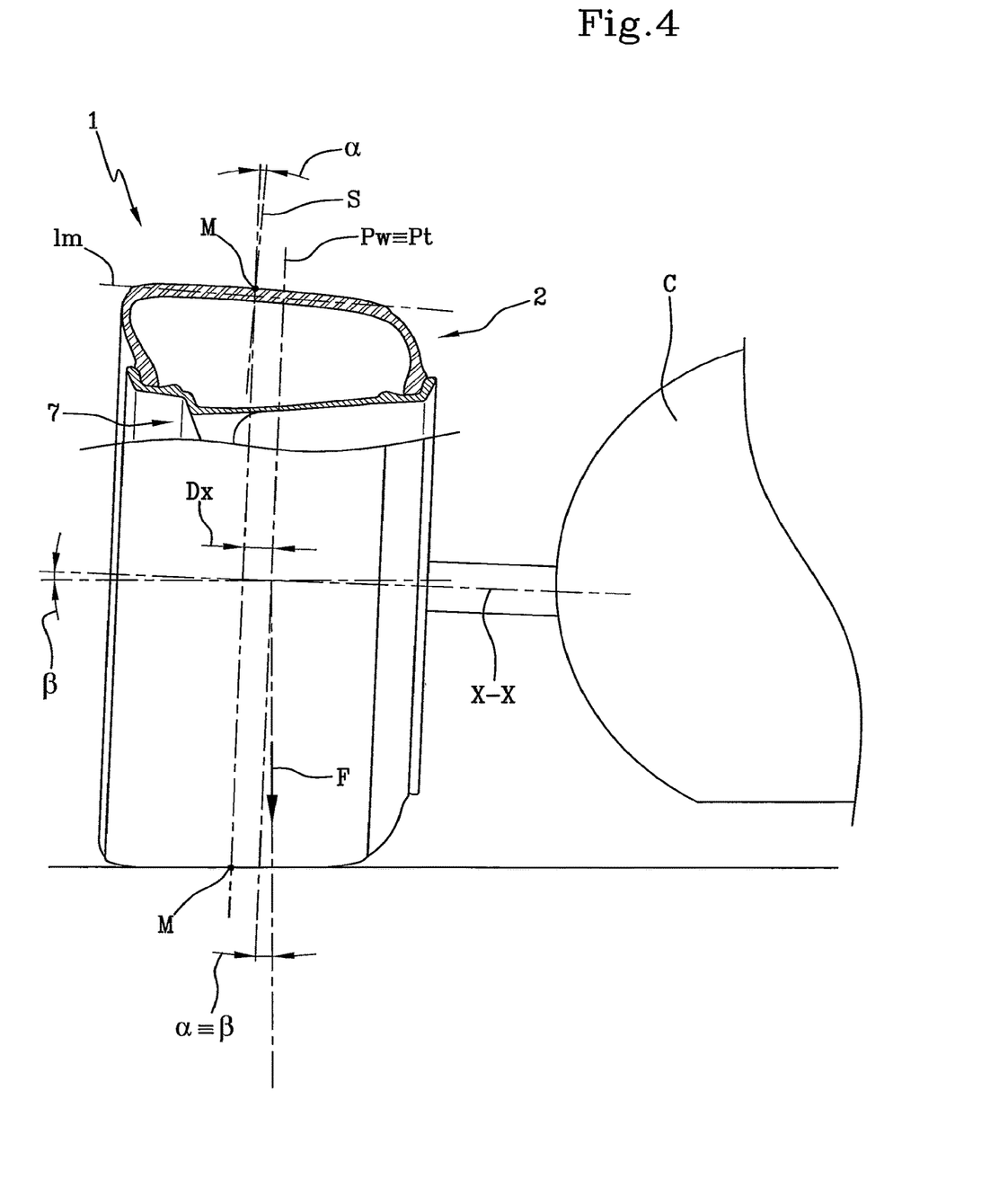
FIG. 4 schematically shows a motor-vehicle provided with the wheel of FIG. 2 in a respective operating condition.

The second embodiment illustrated in FIGS. 2 and 4 is distinguished from the first embodiment since the tread band 9 together with the belt structure 8 and the crown portion of the carcass structure 3, in addition to being rigidly rotated the predetermined angle "α", are also translated along an axial direction towards the axially external housing 12a of the rim 7. The symmetry axis "S" of the tread band 9 of each radial half-section is axially shifted by a predetermined distance "Dx" relative to the mid-line plane "$P_W$" (or "$P_T$") of the wheel 1 or of the tyre 2. Also the median circumferential line is substantially shifted the same predetermined distance "Dx". Preferably, such predetermined distance "Dx" is included between about 3 mm and about 30 mm.

It follows that the axially external axial end portion 9a is further both from the mid-line plane "$P_W$" (or "$P_T$") and from the rotation axis "X-X" with respect to the axially internal axial end portion 9b. In the illustrated embodiment, the axial distance "Z1" from the mid-line plane "$P_W$" of the axially external axial end portion 9a is greater than the axial distance "Z2" from the mid-line plane "$P_W$" of the axially internal axial end portion 9b.

The sidewall 10 corresponding with the axially external axial end portion 9a is rotated around the respective bead 6 towards the outside of the wheel 1, moving away from the mid-line plane "$P_W$" (or "$P_T$") while the sidewall 10 corresponding to the axially internal axial end portion 9b is rotated around the respective bead 6 towards the interior of the wheel 1, moving close to the mid-line plane "$P_W$" (or "$P_T$").

Also the wheel 1 with the tyre 2 inflated to the operating pressure and in accordance with the second embodiment is mounted on the motor-vehicle "C" with the camber angle "β" equal to about −3° and equal in absolute value to the predetermined angle "α" (FIG. 4).

The difference with respect to the wheel 1 of FIG. 3 lies in the fact that the tread band 9 is further from the motor-vehicle "C" than the predetermined distance "Dx" while the positions of the rim 7, of the hub and of the vertical line along which the force "F" acts are the same.

Figure 4A:
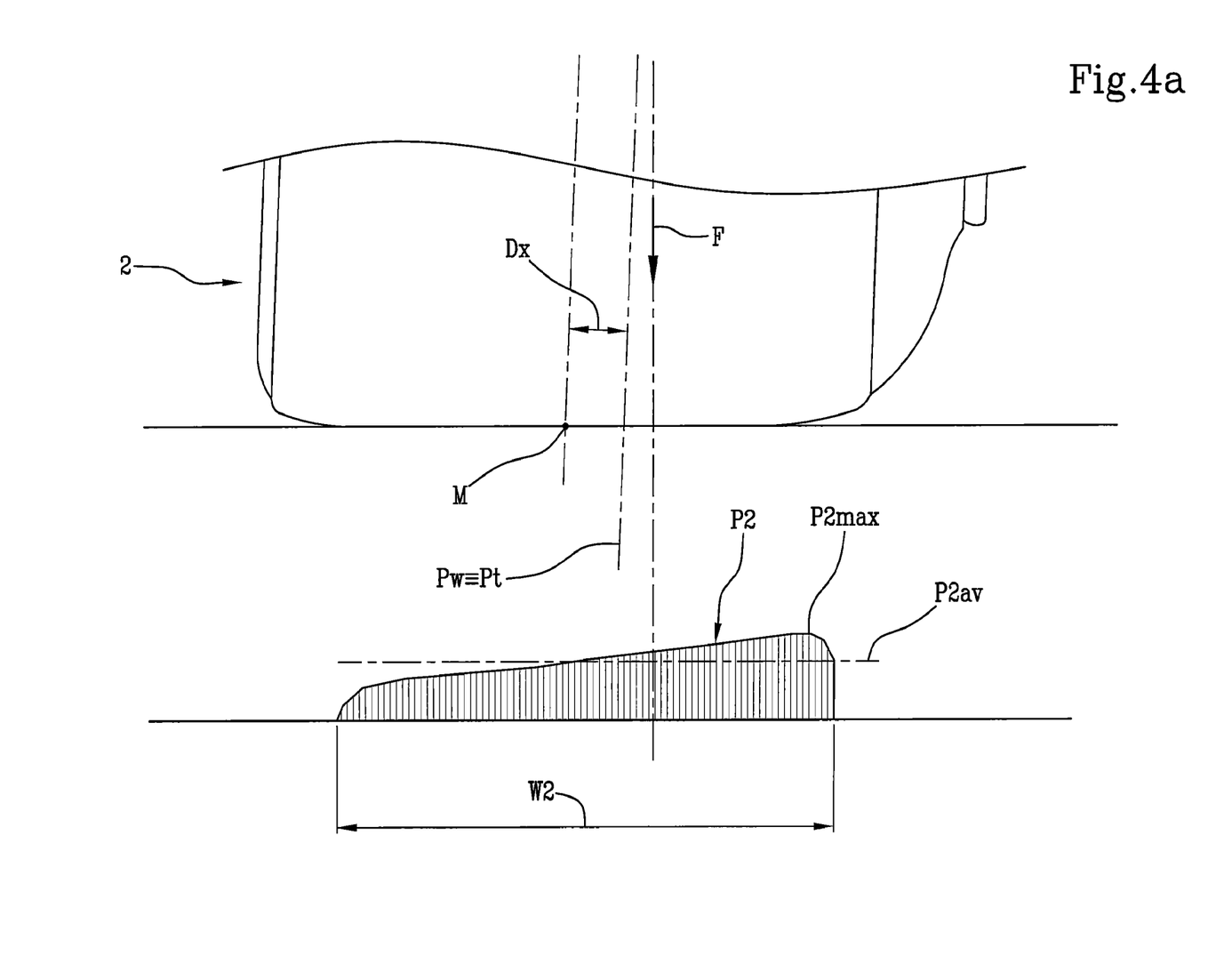
FIG. 4a illustrates the transverse distribution of the footprint contact pressures of the wheel of FIG. 4 calculated at the radial section of the tyre orthogonal to the road plane.

As can be observed, during the running on a straight line, the transverse pressure distribution on the tyre 2 of FIG. 4a is more uniform than that of the conventional tyre 2' of FIG. 5a even if less uniform than the tyre 2 of FIG. 3a. Instead, the peak pressure "P2max" of the distribution "P2" in accordance with the second embodiment is about ³⁄₂ the average pressure "P2av" (intended as integral of the transverse pressure distribution "P2" divided by the width "W2"). Such greater but still limited asymmetry relative to the tyre of FIG. 3a is due to the greater non-alignment between the centre line of the footprint area (which corresponds with the median circumferential line of the tread band 9 placed in correspondence with the footprint area) and the vertical line along which the force "F" acts.

The asymmetric tyres 2 as described above are preferably manufactured by means of building a conventional green tyre with cross section with external profile that is symmetric to a mid-line plane "$P_T$" thereof. Preferably but not exclusively, the symmetric green tyre is built by means of assembly of respective components on a forming support. Subsequent to the building of the symmetric green tyre, a vulcanising and moulding treatment is executed aimed to: determine the structural stabilization of the tyre by means of cross-linking of the elastomeric compositions, conferring an asymmetric shape to the vulcanised tyre for example as was previously described with reference to the two illustrated embodiments, as well as imparting a desired tread design on the same tyre and possible distinctive graphic signs at the sidewalls of the tyre.

For such purpose, the green tyre is introduced into a vulcanisation mould comprising portions arranged mutually adjacent which, once closed, delimit a vulcanisation and moulding cavity adapted to confer the desired form to the vulcanised tyre 2.

In particular, in order to obtain the tyre 2 in accordance with the first embodiment of FIGS. 1 and 3, with vulcanisation and moulding, one of the sidewalls 10 is radially compressed in order to reduce the diameter of the corresponding axial end portion 9b of the tread band 9 and the other sidewall 10 is radially extended in order to increase the diameter of the corresponding axial end portion 9a of the tread band 9, in a manner so as to rotate said tread band 9 by the abovementioned predetermined angle "α".

In order to obtain the tyre 2 in accordance with the second embodiment of FIGS. 2 and 4, one of the sidewalls 10 in additionally to being radially compressed is rotated around the respective bead 6 in order to reduce the diameter of the corresponding axial end portion 9b of the tread band 9 and shift it towards the mid-line plane "$P_T$". The other sidewall 10 is radially extended and rotated around the respective bead 6 in order to increase the diameter of the corresponding axial end portion 9a of the tread band 9 and to move it away from the mid-line plane "$P_T$", in a manner so as to rotate said tread band 9 by the abovementioned predetermined angle and translate it the abovementioned distance "Dx".

The tyres 2 described allow actuating a method for controlling the symmetry of the footprint area of the tyre running on a straight trajectory with camber angle different from zero, preferably on a set of four tyres 2 in a motor-vehicle "C". In the conventional symmetric tyres with camber angle different from zero, like that illustrated in FIG. 5, the distribution of the contact pressure is strongly asymmetric and shifted towards the shoulder of the tyre 2' which results more flattened mainly due to the tilt of the medium line "lm" of the tread band. If the camber angle is negative, the more flattened shoulder is the inner shoulder towards the motor-vehicle; if the camber angle is positive, the more flattened shoulder is the outer one.

The method provides for reducing the contact pressure of the tyre on the footprint area at an inner shoulder, if the camber angle β is negative, or at an outer shoulder, if the camber angle β is positive, disposing any medium line "lm" of the tread band 9 placed in correspondence with the footprint area substantially parallel to the ground (FIG. 3).

The method also preferably provides for shifting a median circumferential line of the tread band 9 towards the outside of the motor-vehicle "C" by a predetermined distance "Dx" relative to a mid-line plane "PW" of said wheel 1 (FIG. 4). The medium line "lm" of the tread band 9 of the tyre 2 remains substantially parallel to the ground during running on a bend, limiting the asymmetry of the footprint area also in this operating condition.

The invention claimed is:

1. A method for controlling symmetry of a footprint area of a tyre running on a straight trajectory, comprising:
    installing the tyre on a motor-vehicle with a camber angle different from zero; and
    disposing a medium line of a tread band of the tyre so the medium line is substantially parallel to the ground once the medium line is in correspondence with the footprint area
    wherein, in each radial half-section, a medium line of the tread band and the rotation axis of the tyre form a predetermined angle different from zero and substantially equal to said camber angle, and
    wherein a median circumferential line of the tread band is axially shifted by a predetermined distance between about 3 mm and about 30 mm relative to the mid-line plane of the tyre.

2. The method of claim 1, further comprising
    maintaining the medium line of the tread band substantially parallel to the ground during running on a bend.

3. The method as claimed in claim 1, wherein the symmetry of the footprint area is controlled during running on a straight trajectory on a set of four tyres installed on said motor-vehicle.

4. The method as claimed in claim 1, wherein the tyre comprises a carcass structure comprising a pair of beads having a same radial distance from a rotation axis of the tyre, and wherein the tread band is disposed at a radially external position with respect to the carcass structure.

5. The method as claimed in claim 4, wherein the beads are symmetric relative to a mid-line plane of the tyre.

6. The method as claimed in claim 1, wherein, in each radial half-section of the tyre, the tread band is symmetric relative to a symmetry axis thereof.

7. The method as claimed in claim 1, wherein axial end portions of the tread band have different axial distances from the mid-line plane of the tyre.

8. The method as claimed in claim 7, wherein the axial end portion that is axially farthest from the mid-line plane of the tyre is also the axial end portion that is radially the farthest from the rotation axis.

9. The method of claim 1, wherein an absolute value of the camber angle ranges from about 0.5° to about 5°.

10. The method of claim 1, wherein the tyre has asymmetric sidewalls relative to the mid-line plane of the wheel.

11. The method of claim 1, wherein installing the tyre includes mounting the tyre on a rim and inflating the tyre to an operating pressure.

12. The method of claim 4, wherein the rim comprises two housings for beads, the housings having a same radial distance from a rotation axis of the wheel.

13. The method of claim 1, wherein the medium line of the tread band is disposed to produce a substantially symmetric pressure distribution along the axial extension of the footprint area when the motor-vehicle runs on a straight line.

* * * * *